United States Patent [19]

Guzik et al.

[11] Patent Number: 4,516,060

[45] Date of Patent: May 7, 1985

[54] DIGITAL MOTOR SPEED CONTROL

[76] Inventors: Nahum Guzik, 224 Lassen Ave., Mountain View, Calif. 94043; Gennady Mangeym, 2564 Downing Ave., San Jose, Calif. 95126

[21] Appl. No.: 443,116

[22] Filed: Nov. 19, 1982

[51] Int. Cl.³ .............................................. H02P 5/06
[52] U.S. Cl. .................................... 318/341; 318/326; 318/327; 318/618
[58] Field of Search ............... 318/311, 326, 327, 328, 318/301, 618, 616, 341

[56] References Cited

U.S. PATENT DOCUMENTS

| | | | |
|---|---|---|---|
| 3,409,814 | 11/1968 | Azuma et al. | 318/327 |
| 3,599,063 | 8/1971 | Nanai et al. | 318/327 |
| 3,843,914 | 10/1974 | Carlson et al. | 318/327 |
| 4,109,184 | 8/1978 | Weber | 318/327 |
| 4,218,641 | 8/1980 | Arnold et al. | 318/327 X |
| 4,280,082 | 7/1981 | Acharya et al. | 318/327 X |

Primary Examiner—Ulysses Weldon
Attorney, Agent, or Firm—Harris Zimmerman; Howard Cohen

[57] ABSTRACT

A motor speed control circuit produces indexing pulses during each revolution of the motor. Each indexing pulse triggers the production of a predetermined pattern of timing pulses. The timing pulses are integrated. The result of the integration is a relatively constant level signal that controls the motor current. At the end of a predetermined pattern of pulses in the binary signal, the integrator input signal goes to one of two binary states and causes the integrator output voltage to ramp up or down, as the case may be, until another indexing pulse is received from the motor. The output of the integrator upon receipt of the indexing pulse controls the speed of the motor while another set of binary pulses are being integrated.

4 Claims, 8 Drawing Figures

DIGITAL MOTOR SPEED CONTROL

BACKGROUND OF THE INVENTION

The present invention relates to a motor speed control circuit, and more particularly to a circuit for maintaining the speed of a motor at a constant level with a high degree of accuracy.

Precision motor speed control circuits have a variety of applications, including phonographic turntables, magnetic audio and video tape recorders, and disk drive units.

One circuit for accurately controlling the speed of a motor is disclosed in U.S. Pat. No. 4,240,014—Muller, assigned to Papst-Motoren KG. In the operation of this ciruit, trigger pulses are generated during the rotation of the motor, for example by an electro-optical encoder or a magnetic tacho-generator. With each detected pulse, a monostable (one-shot) multivibrator is triggered to generate a command pulse having a precisely controlled, predetermined duration. At the end of this command pulse, a capacitor is quickly discharged and then recharged until the next trigger pulse from the motor is detected. The level of charge on the capacitor at this point is maintained for the duration of the succeeding command pulse from the monostable multivibrator. This charge is used as an input to an amplifier that controls the amount of current applied to the motor.

Thus, when the motor is operating at a speed below that which is desired, a relatively long period of time will elapse between the end of one command pulse from the monostable multivibrator and the detection of the next trigger pulse from the motor, causing the capacitor to be charged to a relatively high level. Consequently, a large amount of current will be applied to the motor to cause it to speed up. On the other hand, when the motor is operating at a relatively fast speed, the capacitor will not be charged to as great an extent. Therefore, less current will be applied to the motor and it will slow down.

The type of motor control circuit exemplified in the previously mentioned Papst-Motoren patent is in relatively widespread use because it is able to regulate motor speed with a good deal of accuracy, e.g. within one percent of the desired speed. However, it is desirable to improve upon certain aspects of this circuit. More particularly, since the length of the timing pulse generated by the monostable multivibrator must be very precise, highly accurate components are required. Specifically, a high quality timing capacitor that charges at a well defined rate is used to determine the length of the timing pulses. In addition, a temperature compensation resistor is required to insure that the current that charges the timing capacitor is insensitive to temperature variations. The requirement for the high quality compensate and the need to compensate for temperature adds to the cost and complexity of the circuit.

In addition, the motor control circuit of the patent operates entirely in an analog mode, which also adds to its complexity. It is desirable to utilize present-day digital techniques in the motor control circuit to the extent possible because of the high degree of reliability that they afford at a relatively low cost.

SUMMARY OF THE INVENTION

Broadly speaking, the present invention achieves these objects through the integration of a binary timing signal to control motor speed. The result of the binary signal integration is a relatively constant level signal that controls the motor current. At the end of a predetermined pattern of pulses in the binary signal, the integrator input signal goes to one of two binary states and causes the integrator output voltage to ramp up or down, as the case may be, until another indexing pulse is received from the motor. The output voltage of the integrator circuit after receipt of the next indexing pulse controls the speed of the motor while another set of binary pulses are being integrated. In one representative circuit, the integration of the binary signal between indexing pulses can be relative to a constant reference level that is at the midpoint of the excursion peaks of the signal. In another embodiment, the integration can be performed with reference to a signal that is of equal amplitude but opposite polarity to the binary signal.

Further features and advantages of the present invention are explained hereinafter with reference to preferred embodiments of the invention illustrated in the accompanying drawings.

DETAILED DESCRIPTION

In the following detailed description of preferred embodiments of the invention, reference is made to the control of the speed of a D.C. brushless motor, to facilitate an understanding of the invention. However, it will be appreciated that the invention is not limited to such an application, but rather can be utilized in connection with various types of A.C. and D.C. motors.

Figure 1:
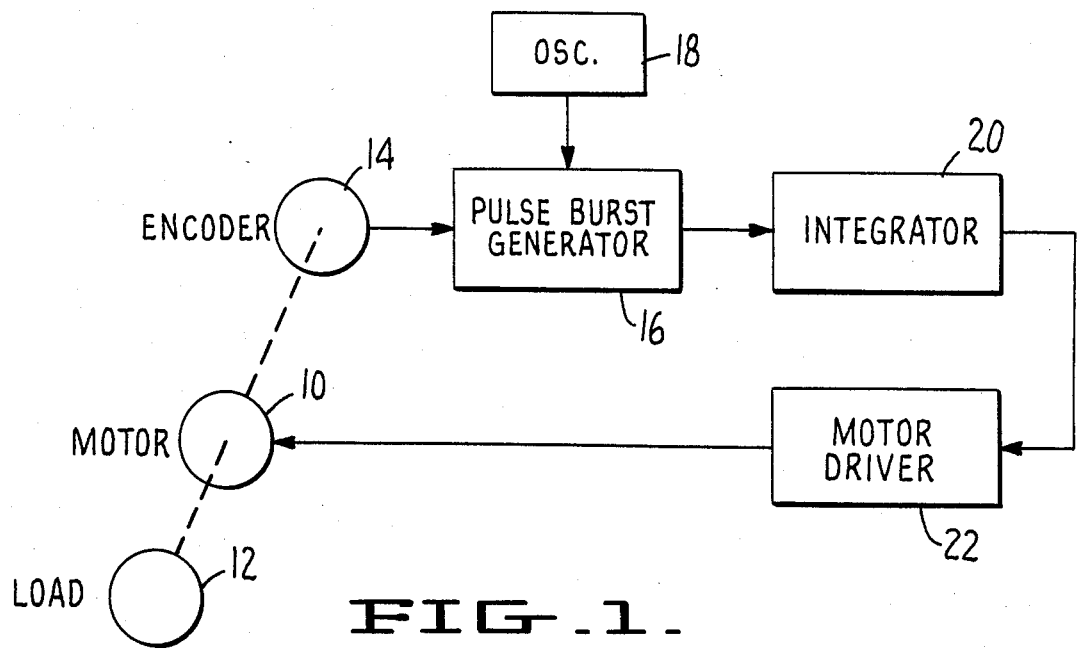
FIG. 1 is a block circuit diagram generally illustrating the basic components and operating principles of a motor control circuit constructed in accordance with the principles of the present invention.

Referring to the functional block diagram of FIG. 1, a motor 10 is connected to a load 12 to drive the load at a certain required speed. For example, the motor might form part of a disk drive unit to rotate a magnetic recording disk at a predetermined speed so that bits of information can be stored onto and read from the disk. An encoder 14 is operatively connected to the motor 10 and produces one or more indexing pulses for each rotation of the rotor in the motor. The encoder 14 could be of the electro-optical type, with a slotted disk connected for rotation with the motor. Alternatively, it can be a Hall-effect type sensor that is responsive to the changes in the rotating magnetic field of the motor, and in the case of a brushless motor constitutes an integral part of the motor. Other suitable types of encoders can be used as well.

The indexing pulses from the encoder 14 are applied to a pulse burst generator 16. Upon receipt of each indexing pulse, the generator 16 produces a burst comprising a predetermined pattern of binary electrical pulses having a frequency related to the output signal of an oscillator 18 connected to the generator.

This pattern of pulses in each burst is fed to an integrator 20 which integrates them relative to a reference signal, voltage or current, such that an output signal having a relatively constant D.C. level is produced by the integrator during the time that the burst of pulses is applied thereto. At the end of the pulse burst, the output signal from the generator 16 is held in one of two binary states until the next indexing pulse is received from the encoder 14. During this time, the integrator output voltage either increases or decreases to a level dependent on the total time that the selected binary state of the signal from the generator 16 is applied to the integrator. Thus, the integrator output voltage depends on the length of time between the end of the pattern of pulses in one burst and the occurance of the next indexing pulse. This voltage is held relatively constant during the generation of the next pulse pattern, and is applied as an input signal to a motor driving circuit 22. In response to this signal, the motor driving circuit controls the amount of current that is applied to the motor, to thereby regulate the speed of the motor.

Figure 2:
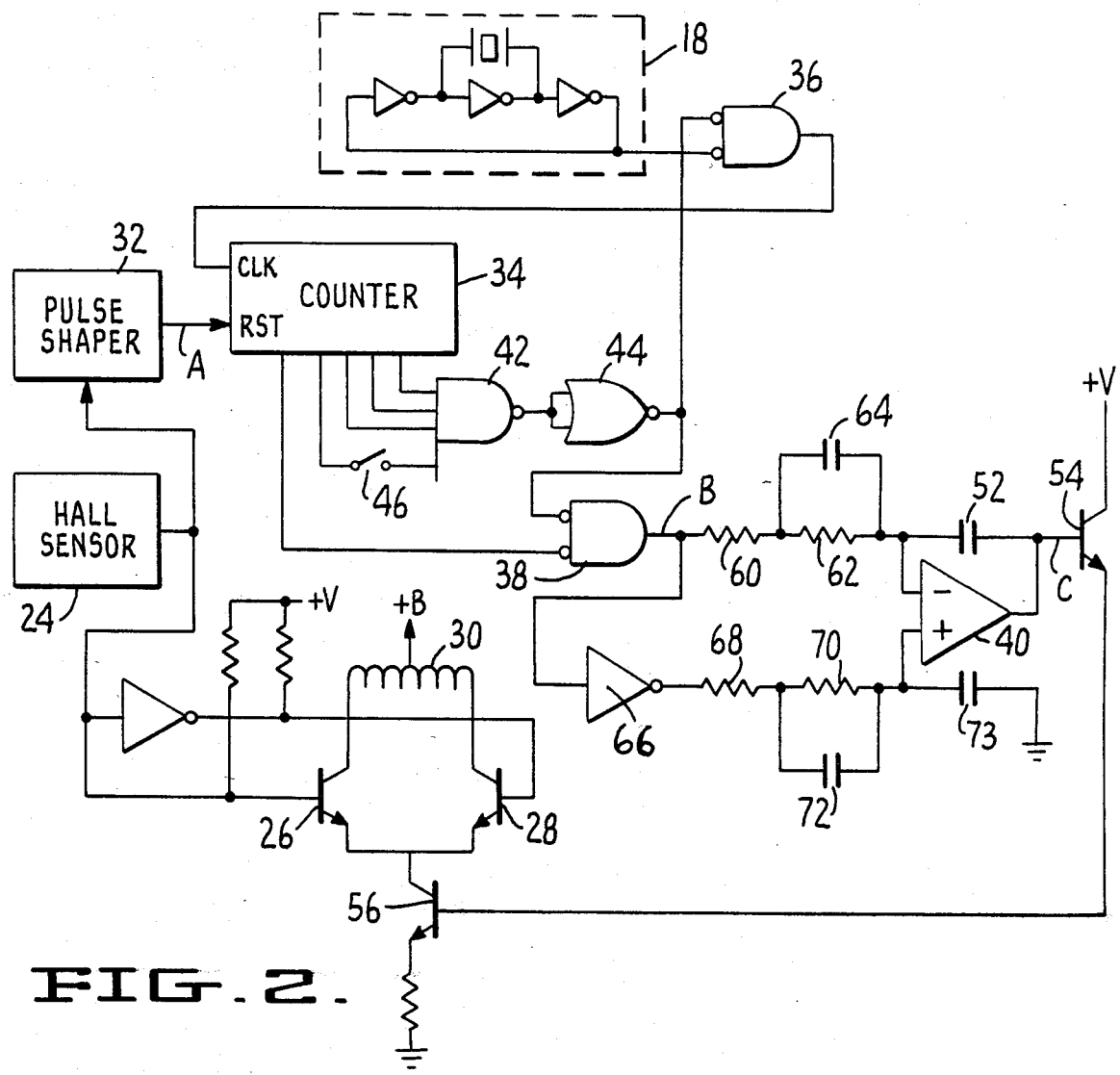
FIG. 2 is schematic circuit diagram illustrating the components of the circuit of FIG. 1 in greater detail.

A more detailed schematic diagram of a circuit that operates in this manner is illustrated in FIG. 2. In this embodiment, the encoder 14 comprises a Hall sensor 24 that operates in a well known manner to alternately actuate two transistors 26 and 28 to control the flow of current through the field windings 30 of a D.C. brushless motor. The output signal of the Hall sensor 24 is also processed in a pulse shaping circuit 32. For example, the pulse shaping circuit 32 can produce an indexing pulse upon each 90° of rotation of the rotor, to thereby generate four substantially equally spaced pulses during each motor revolution.

The indexing pulses from the pulse shaping circuit 32 are applied to the reset input terminal of a counter 34. Clock pulses from an oscillator 18, for example a crystal oscillator, are applied to the clock input terminal of the counter 34 through an AND gate 36.

The output pulses appearing at one of the data output terminals of the counter 34 are applied to one input terminal of an AND gate 38. The AND gate 38 is normally in a conducting mode and applies these pulses as timing pulses to the inverting input terminal of an integrating operational amplifier 40 through an input network consisting of a pair of series-connected resistors 60 and 62, one of which has a shunt capacitor 64. This signal is also applied to an inverter 66, and the inverted signal is applied to the non-inverting input terminal of the amplifier 40 through a corresponding input network consisting of resistors 68 and 70, one of which has a shunt capacitor 72. A capacitor 73 connected between the input terminal and ground corresponds to the feedback capacitor 52 of the integrator.

Some of the more significant data output terminals of the counter 34 are connected to the input terminals of a NAND gate 42. These data output terminals of the counter that are connected to NAND gate 42 are selected in accordance with a predetermined pattern of pulses such that a preselected square wave of constant frequency and duration, i.e. a given number of timing pulses, are applied to the amplifier 40. When all of the input signals to the NAND gate 42 are high, indicating that the given number of timing pulses have been applied to the amplifier, the NAND gate produces an output signal that is applied to a NOR gate 44. The NOR gate in turn produces an inhibit signal that is applied to both of the AND gates 36 and 38, to interrupt the supply of clock pulses to the counter 34 and terminate the timing pulses passing through the AND gate 38. When the next indexing pulse is received from the pulse shaping circuit 32, the counter is reset and another burst of timing pulses is applied to the amplifier 40. The various data output terminals of the counter 34 can be connected to the NAND gate 42 by means of switches 46 to vary the predetermined pattern of pulses, (e.g. a given number of pulses in a given time period) that are applied to the amplifier 40.

Since the difference between the two input signals to the amplifier 40 is always of the same magnitude, and such signals differ only in polarity during each half cycle of the square wave pulse burst signal from the AND gate 38, the feedback capacitor 52 of the integrator will charge and discharge an equal amount during each cycle. Consequently, the output signal of the integrator will be a relatively constant signal during the time that the predetermined pattern of timing pulses are applied thereto.

At the end of the pulse burst, the two input signals to the integrator circuit will be held in their respective binary states. For example, the signal at the non-inverting input terminal might be V volts and the signal at the inverting terminal can be zero volts. During this time, the integrator output voltage will begin to increase. The integrator output level that is reached (e.g. the level of charge on capacitor 52) upon initiation of the next pulse burst from AND gate 38 will be maintained by the relatively constant output signal produced by the integration of the timing pulses. The integrator output signal is applied to a suitable buffer amplifier, for example an NPN transistor 54, and fed to a current control transistor 56 to regulate the amount of current that is applied to the windings 30 of the motor 10. Thus, a higher average level of integrator output signal will result in a greater amount of current being supplied to the windings 30, to thereby increase the speed of the motor.

Figure 3:
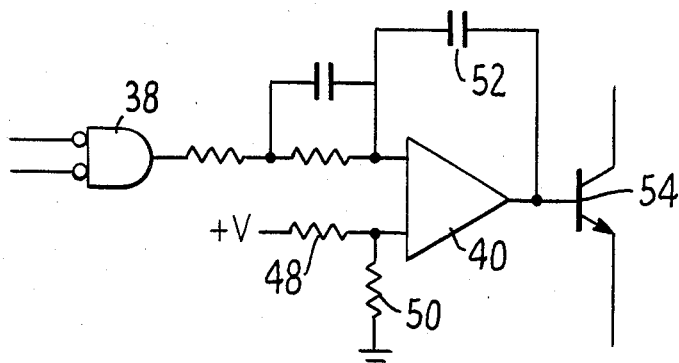
FIG. 3 is a schematic circuit diagram of an alternate embodiment for providing a reference input signal to the integrator.

An alternative integrator circuit is a single ended integrator employing a reference voltage. This is shown in FIG. 3 wherein the non-inverting input terminal of the amplifier 40 receives a reference voltage signal determined by a voltage divider comprising two resistors 48 and 50. These resistors are matched resistors having the same resistance values. The reference voltage that is produced at their junction is equal to one-half the peak-to-peak excursion voltage of the timing pulses at the output terminal of the AND gate 38. In other words, if the two binary levels of the signal from the AND gate 38 are zero and V volts, respectively, the reference signal provided to the amplifier 40 by the voltage divider 48 and 50 is V/2 volts.

The circuit of FIG. 3 requires only two components having a high degree of accuracy. One of these is the oscillator 18. However, this requirement is not a problem since a crystal oscillator having a high degree of accuracy can be readily obtained at a relatively low cost. The other highly accurate component is the voltage divider comprised of the resistors 48 and 50. While the actual resistance values of the resistors are of little consequence, it is preferable that their resistances be within 0.1% of each other, so that the reference voltage provided to the integrator is accurate. In contrast, although the embodiment of FIG. 2 requires a few more components, it is not necessary that the resistors 68 and 70 and the capacitors 72 and 73 match the resistors 60 and 62 and the corresponding capacitors 64 and 52 with the same degree of accuracy as the matched resistors 48 and 50 in the embodiment of FIG. 3. Consequently, the FIG. 2 embodiment may be preferable from one or both of the standpoints of cost and accuracy.

In the implementation of the invention, the oscillator, the counter and the pulse shaping circuit can be discrete components as illustrated in the drawings. Alternatively, any one or more of their functions can be provided by a suitably programmed microprocessor, such as an Intel 8048 series microprocessor, or the like.

Figure 4A:
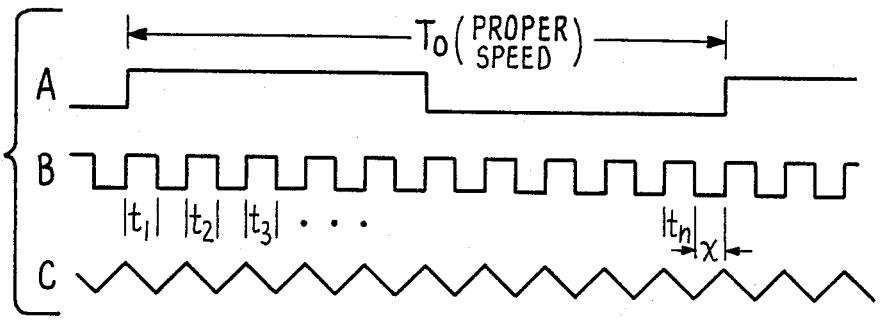
FIGS. 4a, 4b and 4c are timing diagrams illustrating the operation of the circuit of FIG. 2 when the motor is operating at the desired speed, as in FIG. 4a, below the desired speed, as in FIG. 4b, and above the desired speed, as in FIG. 4c.

The operation of the circuit of FIG. 2 is explained in further detail with reference to the timing diagrams of FIG. 4. A pattern of n timing pulses that is to be produced in each burst is determined according to the sum of their positive half cycles $t_1$ to $t_n$ and the length of the period, T, between the leading edge of two successve indexing pulses when the motor is running at the desired speed. This pattern is chosen so that the sum $t_1+t_2\ldots +t_n$ is directly related to a given value for $T_o$ corresponding to a desired speed for the motor. In the embodiment shown the sum equals $T_o/2$. Although not required, if all the t's are the same length, $nt=T_o/2$. FIG. 4a represents the condition which occurs when the motor is running at the proper speed. When the indexing pulse occurs (signal A), a burst of n positive timing pulses (signal B) is generated.

At the end of the last positive pulse $t_n$, the output signal from the AND gate 38 goes to the binary low state and remains there for a period of time, x, until the next indexing pulse occurs. When the motor is running at the proper speed, as indicated in FIG. 4a, this period of time is nominally equal to one-half the period of the last cycle in the pulse burst signal. In this case the output signal of the integrator (signal C) will have a constant D.C. content since the integrator voltage will ramp up during the time x by an amount equal to the amount which it ramped down during the last positive pulse in the timing signal.

Figure 4B:
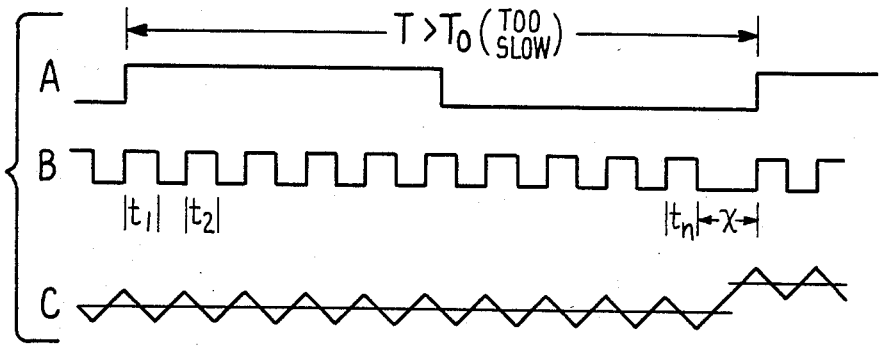

The situation where the motor is running at less than the desired speed is depicted in FIG. 4b. In this case, the elapse of time T between two successive indexing pulses is longer than the desired time period $T_o$. Consequently, after the nth positive pulse in the pulse burst signal B has been produced, the time period x until initiation of the next pulse burst signal will be longer than the normal $t_n$ value. In this case, the integrator voltage will ramp up during time x by a greater value than it ramped down during the last positive pulse in the pulse burst pattern. When the next pulse burst is generated, the D.C. content of the integrator output signal C will be higher. In the extreme case where the motor is running at a much slower speed than is desired, for example during initial start-up, the transistor 56 will be saturated. Thus, a maximum amount of current will be supplied to the windings of the motor to cause its velocity to increase until it attains the proper speed.

Figure 4C:
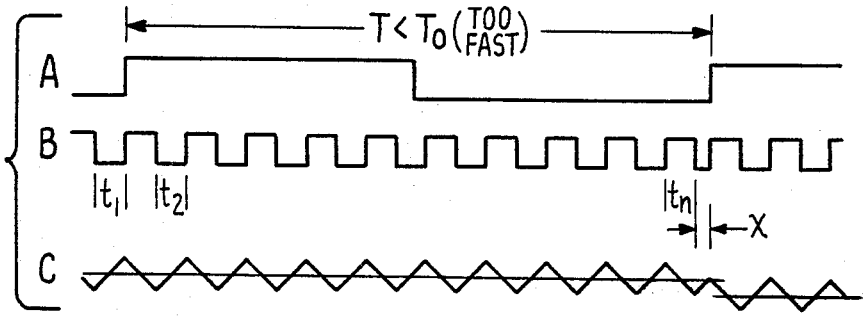

FIG. 4c illustrates the situation in which the motor is running faster than the desired speed. As indicated, the period T between indexing pulses (Signal A) is shorter than the desired value $T_o$. In this case, the time period x will be less than the positive period of the last burst pulse signal $t_n$, so that the integrator output voltage (Signal C) will ramp up less than it ramped down during the last burst pulse. Consequently, the D.C. content of the integrator output signal will be lowered, causing the motor to slow down.

It is the D.C. content of the integrator output signal that controls the transistor 56, and hence the amount of current that is applied to the motor. Generally, the motor will be insensitive to the small A.C. content of the signal. However, if it is found that the A.C. portion of the signal interferes with operation of the control system, this effect can be attenuated by connecting a suitable capacitor to the motor windings 30 to shunt the A.C. noise to ground, or by any other suitable means.

The speed of the motor can be changed by varying the pattern, e.g. the number or length (or both) of the n pulses in the pulse burst. A change in number can be accomplished by selectively connecting the various data output terminals of the counter 34 to the NAND gate 42 through appropriate actuation of the switches 46. Alternatively, it is possible to vary the speed of the motor by changing the frequency of the pulse burst signal, so that the time periods $t_1$ to $t_n$ and $T_o$ are correspondingly changed.

In the embodiment of FIG. 2, the period t of the timing pulses applied to the integrator are the same for each pulse, i.e. $t_1=t_2=t_3=\ldots t_n$. Thus $T_o=nt$. In some cases it may be desirable to have timing pulses of different widths within each pulse burst. For example, referring to FIG. 4c, it will be appreciated that if the motor is running fast enough above the desired speed such that the reset pulse in signal A occurs at or before the end of the last positive pulse, i.e. $x=0$, the charge on the capacitor will not be lowered. In fact, it may be increased, causing the motor to speed up even more.

Consequently, it may be desirable to increase the width of the last positive pulse to thereby increase the capture range of the circuit and thus tolerate greater deviations from the desired speed. This can be done by decreasing the frequency of the pulse burst so that all of the pulses have the same, but larger, width. However, it is more preferable to maintain a relatively high frequency for most of the pulse burst, and generate a longer pulse only during the last pulse of the burst. By maintaining the higher frequency pulses, large voltage excursions in the integrator output signal are avoided.

Figure 5:
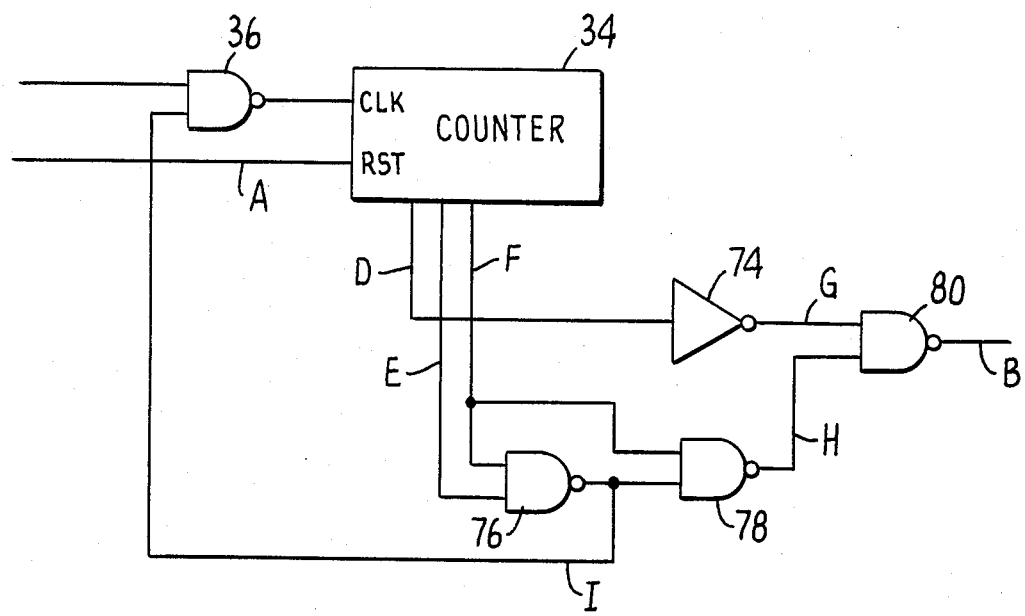
FIG. 5 is a schematic circuit diagram of an alternate embodiment for generating the predetermined pattern of pulses.

One circuit for generating a pulse burst with a longer last pulse is illustrated in FIG. 5. As in the circuit of FIG. 2, the counter 34 is clocked by clock pulses applied through a NAND gate 36 and reset by the indicator pulses (signal A) from the pulse shaping circuit. Three of the binary data output terminals of the counter are utilized to produce the pulse burst. The two most significant terminals are respectively connected to the input terminals of a NAND gate 76. The output signal of this gate is applied to an input terminal of the NAND gate 36, and functions as the inhibit signal to interrupt the supply of clock pulses to the counter.

The output terminal of the NAND gate 76 is also connected to one input terminal of a second NAND gate 78, the other input terminal of which is connected to the most significant of the three data output terminals of the counter that are being utilized. The output terminal of this NAND gate is applied to one input terminal of a third NAND gate 80. This gate also receives the binary signal from the least significant of the three counter data terminals, which signal is inverted in an inverter 74.

Figure 6:
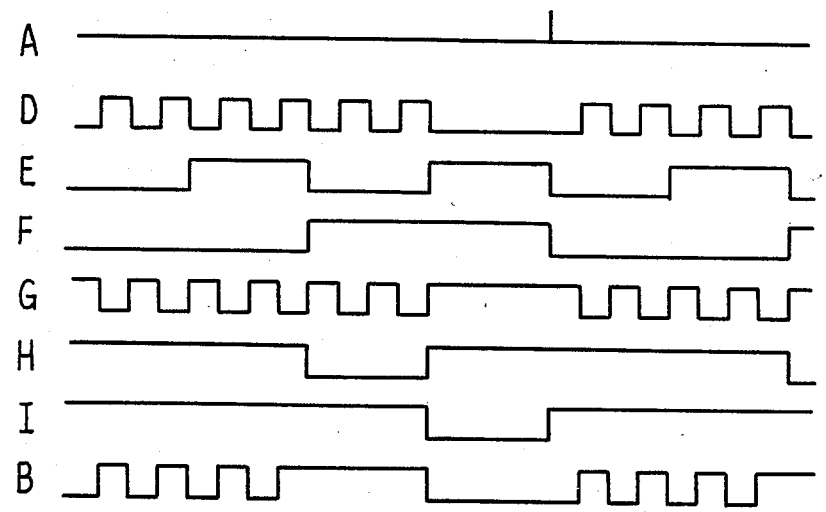
FIG. 6 is a timing diagram illustrating the signals produced at various referenced points in the circuit of FIG. 5.

The operation of the circuit of FIG. 5 is explained with reference to the timing diagram of FIG. 6, wherein the signals appearing at various portions of the circuit are correspondingly labelled. As long as the most significant binary signal F from the counter remains low, the output signal H of the NAND gate 78 will be high. Consequently, the pulses G from the least significant terminal will pass through the gate, and be reinverted. The pulses in this signal form the high frequency portion of the pulse burst.

When the most significant signal F goes high, the output signal from the NAND gate 78 will go low, causing the NAND gate 80 to remain in the high state. This condition is maintained until the signal E from the data output terminal of middle significance goes high. At this point, the output signal of the NAND gate 76 goes low, inhibiting the presentation of any further clock pulses to the counter through the NAND gate 36. This low signal also causes the output signal from the NAND gate 78 to go high, which in turn causes the output signal from the NAND gate 80 to go low.

The circuit remains in this state until the next reset pulse occurs in signal A, at which point the process is repeated. As can be seen from signal B represented in FIG. 6, the pulse burst comprises a series of short pulses followed by one long pulse, providing an increased capture range. The point at which the long pulse is initiated, i.e., the number of short pulses in the pattern, is determined by the data output terminal, or combination of terminals, that is chosen to provide the signal F. The length of this pulse is determined by the data output terminal, or terminals, that is chosen to provide the signal E. In the case where the motor is running at the proper speed, the length $t_n$ of this pulse will be the same as the time x from termination of the pulse to the occurrence of the next reset pulse.

From the foregoing, it will be appreciated that the present invention provides a relatively simple circuit that is capable of controlling the speed of the motor with a high degree of accuracy. In practice it has been found that the speed of the motor can be controlled to within 0.1% of the desired speed. One basis underlying the high degree of accuracy that is achieved is the fact that the voltage excursions of the capacitor 52 in the integrator are very small, due to the integration of the pulse burst signal. This small voltage range enables a capacitor having a relatively fast response rate to be used. As the frequency of the pulse burst signal is increased, the voltage excursions decrease and a smaller capacitor with a faster response rate can be used.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention as indicated by the appended claims rather than the foregoing description, and all changes that come within the meaning and range of equivalents thereof are intended to be embraced therein.

What is claimed is:

1. Apparatus for controlling the speed of a motor to a desired value, comprising; encoding means for generating a succession of indicator pulses, each pulse having a period T related to the rotational speed of the motor; a pulse burst generator responsive to each of said indicator pulses for generating a predetermined pattern of n pulses such that the sum of their widths $t_1 = t_2 \ldots t_n$ is directly related to a given value for $T_0$ corresponding to a desired speed of said motor; means for integrating said n pulses over said given period T relative to a reference signal to generate an output signal, including a differential integrator having the output of said pulse burst generator as its first input and the logically inverted output of the pulse burst generator as its second input, said output signal being the output of said differential integrator; and a motor drive circuit responsive to said output signal of said integrating means for controlling the speed of the motor to the predetermined speed.

2. Apparatus for driving a motor at a predetermined speed, comprising; encoding means for generating indicator pulses related to the rotational speed of the motor, said indicator pulses having a period $T_0$ when the motor is running at said predetermined speed; timing means responsive to each of said indicator pulses for generating n timing pulses having widths $t_1$ through $t_n$, wherein n is an integer and the sum of $t_1$ through $t_n$ equals $T_0/2$; means for integrating said n timing pulses to generate an output signal, including a differential integrator having the output of the timing means as its first input and the logically inverted output of the timing means as its second input, said output signal being the output of said differential integrator, and a motor driving circuit responsive to said output signal of said integrating means for controlling the speed of the motor to the predetermined speed.

3. The apparatus of claim 2 wherein said timing means comprises a source of clock signals and a counter responsive to said indicator pulses and said clock signals, said counter producing a burst of n timing pulses upon receipt of each indicator pulse and thereafter halting the production of pulses before the next indicator pulse is received.

4. The apparatus of claim 2 wherein said timing pulses comprise a series of pulses each having a first width and at least one pulse having a longer width than said first width.

* * * * *